(12) United States Patent
Cai

(10) Patent No.: US 9,467,647 B2
(45) Date of Patent: Oct. 11, 2016

(54) MULTIPLE RESOLUTION VIDEO NETWORK WITH CONTEXT BASED CONTROL

(75) Inventor: Yang Cai, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 631 days.

(21) Appl. No.: 12/669,680

(22) PCT Filed: Jul. 17, 2008

(86) PCT No.: PCT/US2008/070373
§ 371 (c)(1),
(2), (4) Date: May 24, 2010

(87) PCT Pub. No.: WO2009/012412
PCT Pub. Date: Jan. 22, 2009

(65) Prior Publication Data
US 2010/0231734 A1  Sep. 16, 2010

Related U.S. Application Data

(60) Provisional application No. 60/959,821, filed on Jul. 17, 2007, provisional application No. 60/959,820, filed on Jul. 17, 2007.

(51) Int. Cl.
*H04N 7/12* (2006.01)
*H04N 5/232* (2006.01)
*H04N 5/247* (2006.01)
*H04N 7/18* (2006.01)
*G06K 9/00* (2006.01)

(52) U.S. Cl.
CPC ............ *H04N 7/12* (2013.01); *H04N 5/23206* (2013.01); *H04N 5/23245* (2013.01); *H04N 5/247* (2013.01); *H04N 7/181* (2013.01); *G06K 9/00228* (2013.01)

(58) Field of Classification Search
CPC ..................... H04N 5/23238; H04N 5/23206; H04N 5/232; H04N 5/247; H04N 5/23245; H04N 7/181; H04N 7/12; G06K 9/00228; G08B 13/19608
See application file for complete search history.

(56) References Cited

U.S. PATENT DOCUMENTS

| | | | |
|---|---|---|---|
| 5,852,502 A * | 12/1998 | Beckett | 358/512 |
| 7,075,567 B2 * | 7/2006 | Hunter | G08B 13/19608 348/208.13 |
| 7,082,572 B2 * | 7/2006 | Pea et al. | 715/720 |
| 7,643,742 B2 * | 1/2010 | Watanabe | H04N 5/23212 348/240.2 |
| 8,446,509 B2 * | 5/2013 | Jones | H04N 5/23238 348/333.03 |
| 2006/0176951 A1 * | 8/2006 | Berman et al. | 375/240.01 |
| 2006/0187305 A1 * | 8/2006 | Trivedi et al. | 348/169 |
| 2007/0076099 A1 * | 4/2007 | Eshed et al. | 348/218.1 |
| 2007/0107029 A1 * | 5/2007 | Monroe et al. | 725/105 |
| 2007/0113242 A1 * | 5/2007 | Fetkovich | H04N 19/46 725/19 |
| 2008/0129857 A1 * | 6/2008 | Vau et al. | 348/345 |

* cited by examiner

*Primary Examiner* — Luong T Nguyen
(74) *Attorney, Agent, or Firm* — Reed Smith LLP

(57) ABSTRACT

A system. The system includes a computing device configured for communication with a plurality of multiple resolution cameras and with a display device. The computing device includes a composite image module. The composite image module is configured for receiving composite information from at least one of the multiple resolution cameras, and for generating a composite image based on the composite information.

10 Claims, 6 Drawing Sheets

MULTIPLE RESOLUTION VIDEO NETWORK WITH CONTEXT BASED CONTROL

This application is a national phase application pursuant to 35 U.S. C. §371 of International Application No. PCT/US08/70373, filed Jul. 17, 2008, which claims priority to U.S. Provisional Patent Application No. 60/959,821 filed on Jul. 17, 2007 and U.S. Provisional Patent Application No. 60/959,820 filed on Jul. 17, 2007.

CROSS-REFERENCE TO RELATED APPLICATION

This application claims the benefit of the earlier filing date of U.S. Provisional Patent Application No. 60/959,821 filed on Jul. 17, 2007 and U.S. Provisional Patent Application No. 60/959,820 filed on Jul. 17, 2007. This application is related to the International Application entitled "Multiple Resolution Video Network With Eye Tracking Based Control", filed concurrently herewith.

STATEMENT REGARDING FEDERALLY SPONSORED RESEARCH

This invention was made with United States Government support in the form of Grant No. DAAD19-02-1-0389 from the Army Research Office and Grant No. NNG04GP97G from the National Aeronautics and Space Administration. The United States Government may have certain rights in the invention.

BACKGROUND

This application discloses an invention which is related, generally and in various embodiments, to a multiple resolution video network with eye tracking based control.

Video networks are becoming more and more commonplace, including those utilizing digital cameras in the security and surveillance fields. For most security and surveillance applications, more optimal results are generally realized when more high resolution cameras are included in the video network. More cameras may be utilized to cover a larger geographic area, increase the number of views associated with a particular area, decrease the number of "blind" spots, etc.

However, in many current video networks, especially those which include wireless channels, the maximum bandwidth of the video network often operates to limit the number of high resolution cameras which can be effectively included in the video network. The amount of bandwidth generally needed to transmit high resolution images (e.g., 640×480 pixels) from a high resolution camera at a high frame rate (e.g., 30 frames per second) and at a low compression rate percentage (e.g., 10%) is on the order of approximately nine Megabits per second. Thus, for a video network which includes a wireless channel, the video network may not be able to support a single high resolution camera, depending on the desired resolution, frame rate and compression rate percentage. For example, the approximately nine Megabits per second bandwidth needed in the above example far exceeds the capacity of current Bluetooth technology, which is only on the order of approximately three Megabits per second.

The capacity problem is not limited to video networks which include wireless channels. For a video network which includes twelve high resolution cameras, the required bandwidth generally needed to concurrently transmit high resolution images (e.g., 640×480 pixels) from the twelve high resolution cameras at a high frame rate (e.g., 30 frames per second) and at a low compression rate percentage (e.g., 10%) is on the order of approximately one-hundred and eight Megabits per second, which exceeds the capacity of traditional Ethernet cable, which is only on the order of approximately one-hundred Megabits per second. Thus, depending on the desired resolution, frame rate and compression percentage, video networks utilizing traditional Ethernet cable are often limited to including fewer than twelve high resolution cameras in the video network.

Additionally, for video networks which include a plurality of high resolution cameras, it is generally not practical for a person or persons to intently view each and every one of the high resolution images transmitted by the cameras. In general, each person is typically limited to intently viewing the images from only one camera at a time. Thus, the scheme of sending all images at a high resolution, a high frame rate, and a low compression percentage rate tends to be an inefficient use of valuable network bandwidth.

SUMMARY

In one general respect, this application discloses a system. According to various embodiments, the system includes a computing device configured for communication with a plurality of multiple resolution cameras and with a display device. The computing device includes a composite image module. The composite image module is configured for receiving composite information from at least one of the multiple resolution cameras, and for generating a composite image based on the composite information.

In another general respect, this application discloses a method. The method is implemented at least in part by a computing device. According to various embodiments, the method includes receiving composite information from a multiple resolution camera, and generating a composite image based on the composite information.

Aspects of the invention may be implemented by a computing device and/or a computer program stored on a computer-readable medium. The computer-readable medium may comprise a disk, a device, and/or a propagated signal.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
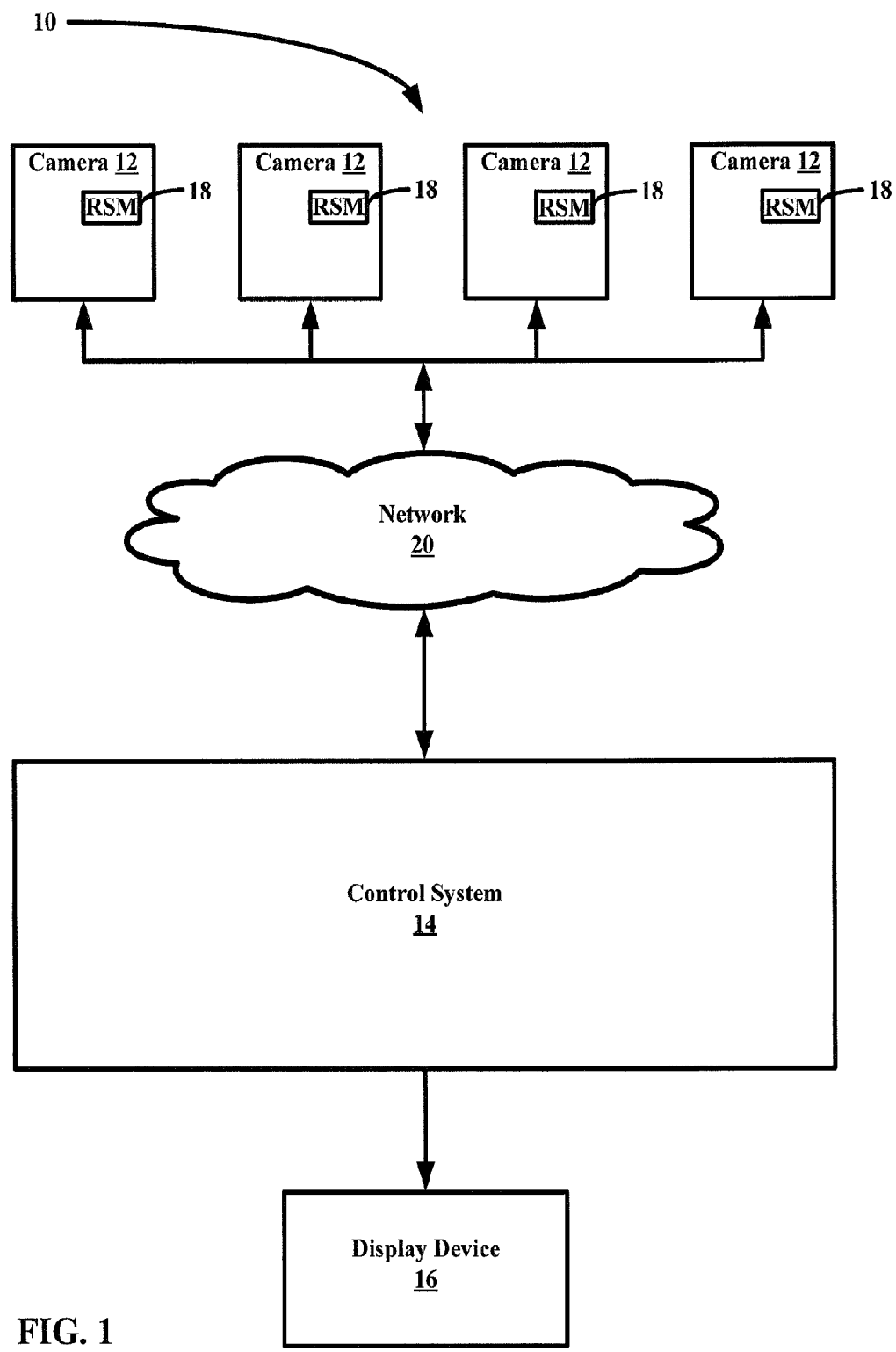
FIG. 1 illustrates various embodiments of a system.

FIG. 1 illustrates various embodiments of a system 10. The system 10 includes a plurality of multiple resolution video cameras 12, a control system 14 in communication with the cameras 12, and a display device 16 in communication with the control system 14. For purposes of simplicity, only four cameras 12 are shown in FIG. 1. However, it will be appreciated that the system 10 may include any number of cameras 12.

Each multiple resolution video camera 12 is configured for operation at more than one resolution, and includes a resolution selection module 18 which is configured to switch the camera 12 to a given resolution. The cameras 12 may be embodied as any suitable multiple resolution cameras. For example, the cameras 12 may be embodied as cameras similar to network cameras manufactured by Axis Communications AB of Lund, Sweden. As will be explained in more detail hereinbelow, the resolution of each camera 12 may be dynamically controlled to switch from one resolution to another. Thus, a given camera 12 may operate at a first resolution at a first time period, and at a second resolution at a second time period. For example, the given camera 12 may operate at a resolution of 640×480 pixels at a first time period, and at a resolution of 320×240 pixels at a second time period. Although the above example describes the operation of the given camera 12 in the context of a "high" resolution (640×480) and a "low" resolution (320×240), it will be appreciated that the multiple resolution video cameras 12 may be configured for operation at resolutions other than 640×480 and 320×240. In addition, it will be further appreciated that according to various embodiments, the multiple resolution cameras 12 may be configured for operation at more than two different resolutions (e.g., at high, medium, and low resolutions).

The cameras 12 are configured to capture images (i.e., frames) at either the first resolution or at the second resolution, and to send the captured images to the control system 14. The cameras 12 are also configured to send the captured images to the control system 14 at any suitable frame rate. For example, according to various embodiments, the cameras 12 may operate to send the captured images to the control system 14 at a frame rate of thirty frames per second. As used herein, the phrase image can mean a single image (i.e., a single frame) or a plurality of images (i.e., a plurality of frames). According to other embodiments, as described in more detail hereinbelow with respect to FIG. 4, the cameras 12 may also be configured to generate images associated with the captured images, and to send the associated images to the control system 14.

As shown in FIG. 1, according to various embodiments, the cameras 12 are in communication with the control system 14 via a network 20. In general, the cameras 12 and the control system 14 each include hardware and/or software components for communicating with the network 20 and with each other. The cameras 12 and the control system 14 may be structured and arranged to communicate through the network 20 via wired and/or wireless pathways using various communication protocols (e.g., HTTP, TCP/IP, UDP, WAP, WiFi, Bluetooth) and/or to operate within or in concert with one or more other communications systems.

The network 20 may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. The network 20 may include elements, such as, for example, intermediate nodes, proxy servers, routers, switches, and adapters configured to direct and/or deliver data.

Figure 2:
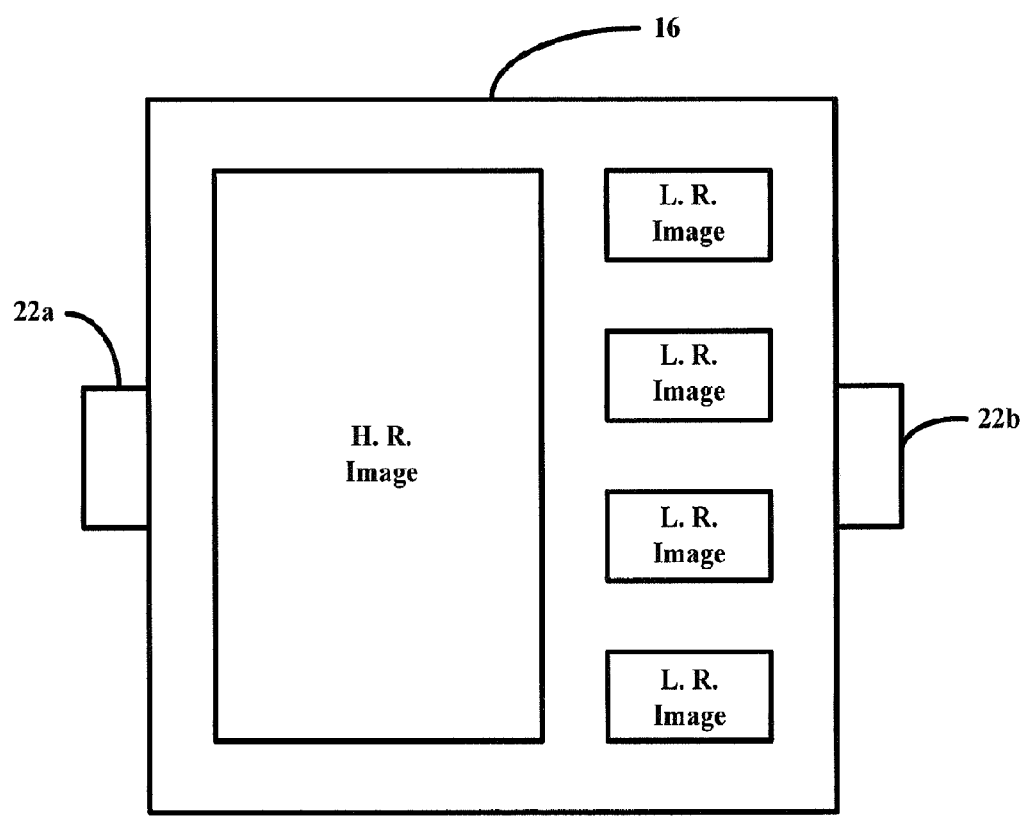
FIG. 2 illustrates various embodiments of a display device of the system of FIG. 1.

The display device 16 may be embodied as any suitable display device. In general, the display device 16 is configured to display the images sent by the respective cameras 12, and the images may be displayed by the display device 16 in any suitable arrangement. As the respective cameras 12 may operate at more than one resolution, the display device 16 may display a number of images at one resolution (e.g., a low resolution), and at least one other image at a different resolution (e.g., a high resolution). For example, as shown in FIG. 2, a "high" resolution image may be displayed on the "left" side of the display device 16 and "low" resolution images may be displayed on the "right" side of the display device 16. According to other embodiments, a "high" resolution image may be displayed proximate a center of the display device 16 and "low" resolution images may be displayed around or proximate the "high" resolution image. Thus, it is understood that the display device 16 may display the images in many other arrangements.

As described in more detail hereinbelow with respect to FIG. 4, according to other embodiments, the display device 16 may also be configured to display a composite image which includes a high resolution portion and a low resolution portion.

For purposes of simplicity, only one display device 16 is shown in FIG. 1. However, it is understood that the system 10 may include any number of display devices 16. For example, according to various embodiments, the system 10 may include two display devices 16—one for displaying the "high" resolution image and the other for displaying the "low" resolution images.

Figure 3:
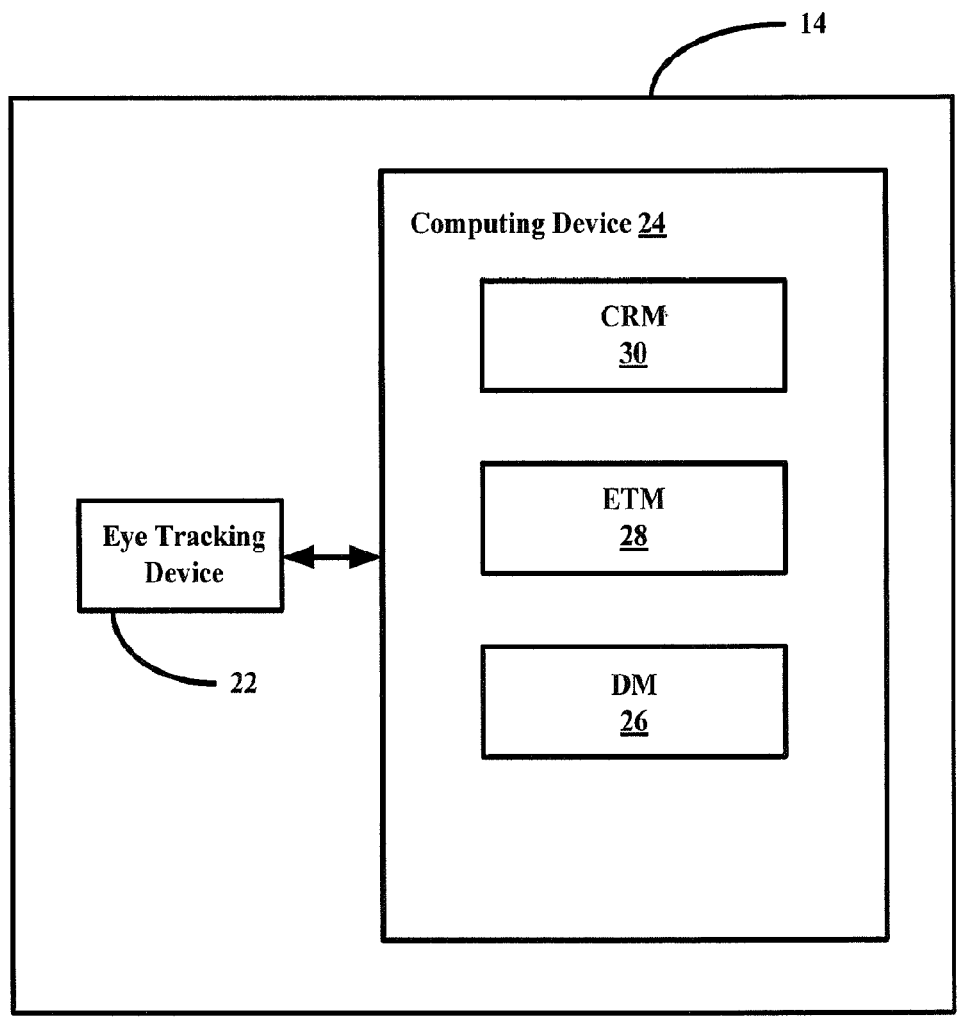
FIG. 3 illustrates various embodiments of a control system of the system of FIG. 1.

FIG. 3 illustrates various embodiments of the control system 14 of FIG. 1. The control system 14 includes an eye tracking device 22, and a computing device 24 which is in communication with the plurality of cameras 12, the display device 16, and the eye tracking device 22. For purposes of simplicity, only one eye tracking device 22 and one computing device 24 are shown in FIG. 3. However, it is understood that the control system 14 may include any number of eye tracking devices 22 and any number of computing devices 24. For example, according to various embodiments, the system 10 may include one eye tracking device 22 for each display device 16.

The eye tracking device 22 may be embodied as any suitable eye tracking device. For example, according to various embodiments, the eye tracking device 22 may be embodied as or similar to the EyeTech TM2 model manufactured by EyeTech Digital Systems, Inc. of Mesa, Ariz. For such embodiments, a first infrared light 22a of the eye tracking device 22 is positioned proximate a first edge (e.g., a "left" edge) of the display device 16 and a second infrared light 22b of the eye tracking device 22 is positioned proximate a second edge (e.g., a "right" edge) of the display device 16. (See FIG. 2). In general, the first and second infrared lights 22*a*, 22*b* are utilized to detect and/or track the position of a person's eyes who is viewing the display device 16.

The computing device 24 includes a display module 26, an eye tracking module 28, and a camera resolution module 30. The display module 26 is in communication with the display device 16, and is configured for delivering images sent from the cameras 12 to the display device 16. As each individual camera 12 is configured for operation at more than one resolution, it is understood that the display module 26 may deliver images of different resolutions to the display device 16 at a given time. For example, in a system 10 with four cameras 12, the display module 26 may deliver the images sent from one of the four cameras 12 to the display device 16 at a first resolution (e.g., at a "high" resolution) and the respective images sent from the other three cameras 12 to the display device 16 at a second resolution (e.g., at a "low" resolution).

The eye tracking module 28 is in communication with the eye tracking device 22, and is configured for associating an individual camera 12 with a position of a person's eye (or eyes) who is viewing the display device 16. In general, when the person focuses on one of the respective images on the display device 16, the person's eye will be more focused on that image than on the other images. According to various embodiments, the eye tracking module 28 associates the position of the person's eye with a position on the display device 16, associates the position on the display device 16 with an image on the display device 16, and associates the image on the display device 16 with an individual camera 12.

The camera resolution module 30 is in communication with the plurality of cameras 12, and is configured for dynamically instructing each camera 12 which resolution to operate at based on information determined by the eye tracking module 28. Such information includes which image on the display device 16 the person's eye is focusing on, and which camera 12 sent the image. According to various embodiments, when a person's eye is focused on a particular image on the display device 16, the camera resolution module 30 instructs the resolution selection module 18 of the appropriate camera 12 to operate the camera 12 at a high resolution. For each camera 12 which is not associated with the particular image, the camera resolution module 30 instructs the appropriate resolution selection modules 18 to operate the corresponding cameras 12 at a low resolution. For such embodiments, the high resolution image sent by the given camera 12 will be displayed at a high resolution on the display device 16, and the respective low resolution images sent by the other cameras 12 will be displayed at a low resolution on the display device 16. The format of the instruction to change a camera 12 from one resolution to another resolution may be realized in any suitable manner. For example, according to various embodiments, the camera resolution module 30 may send a simple high or low signal (e.g., a "0" or a "1") to the resolution selection module 18 of a given camera 12 to initiate a change of the resolution of the camera 12.

The modules 18, 26, 28, 30 may be implemented in either hardware, firmware, software or combinations thereof. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The respective modules 18 (e.g., software application, computer program) may be stored on computer-readable mediums of the corresponding cameras 12 such that when the mediums are read, the functions described herein are performed. Similarly, the modules 26, 28, 30 (e.g., software application, computer program) may be stored on another computer-readable medium (e.g., disk, device, and/or propagated signal) such that when a computer reads the medium, the functions described herein are performed.

According to various embodiments, the respective modules 18 may reside at the corresponding cameras 12. Each of the modules 26, 28, 30 may be in communication with one another, and may reside at the computing device 24, at other devices within the system 10, or combinations thereof. For embodiments where the system 10 includes more than one computing device 24, the modules 26, 28, 30 may be distributed across a plurality of computing devices 24. According to various embodiments, the functionality of the modules 26, 28, 30 may be combined into fewer modules (e.g., a single module).

Figure 4:
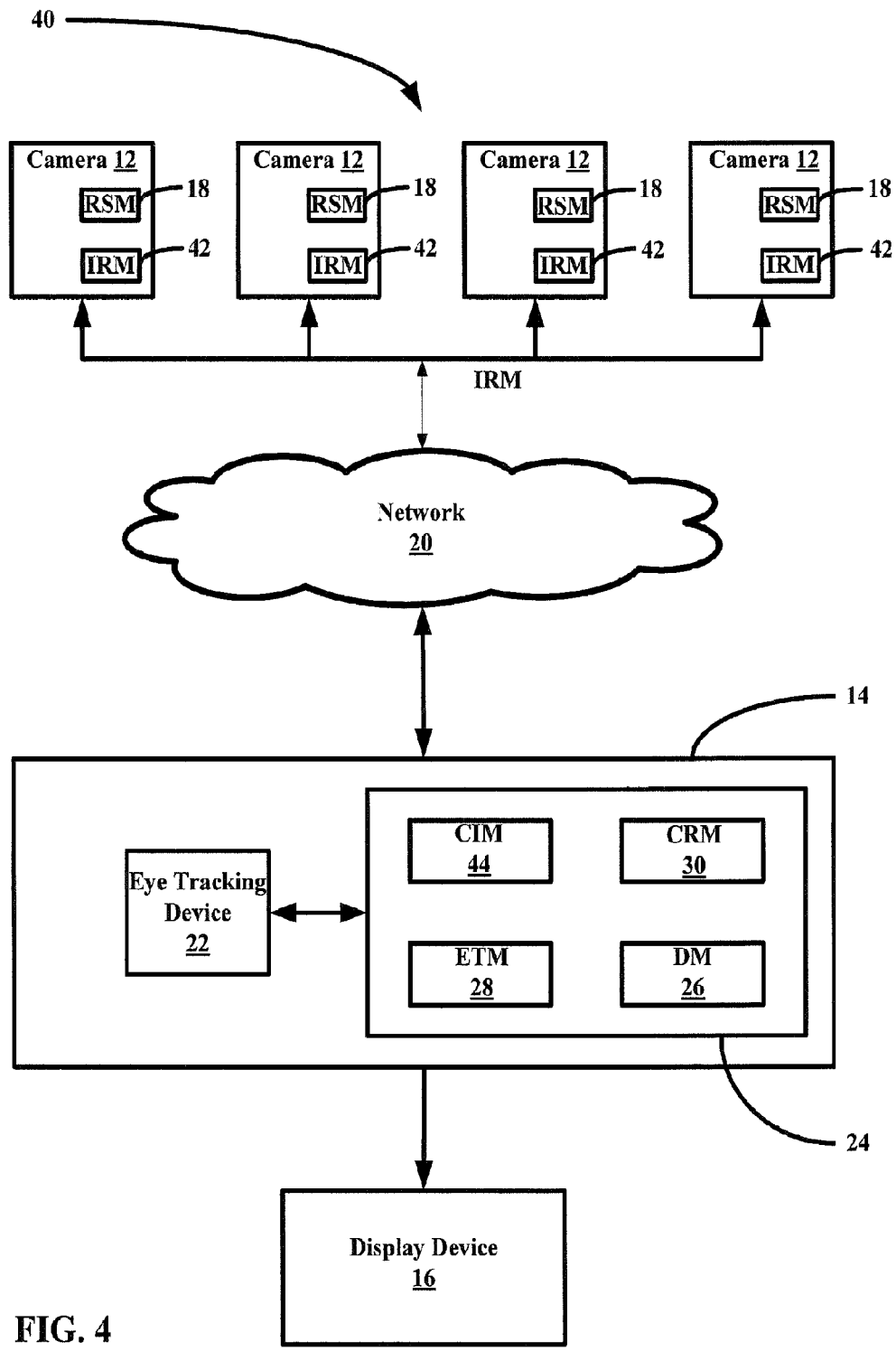
FIG. 4 illustrates various embodiments of another system.

FIG. 4 illustrates various embodiments of another system 40. The system 40 is similar to the system 10 of FIG. 1, but is different in the ways described hereinbelow. In the system 40 of FIG. 4, each of the cameras 12 further includes an image resolution module 42. According to various embodiments, each of the image resolution modules 42 is configured to determine whether a high resolution image captured by the corresponding camera 12 includes a particular object of interest. The respective image resolution modules 42 may be configured to determine whether a variety of different objects of interest are included in a given high resolution image. For example, according to various embodiments, a human face may be an object of interest. The determination may be realized in any suitable manner. For example, according to various embodiments, facial recognition software (e.g., software functionally similar to Intel Open CV) residing at the image resolution module 42 may be utilized to determine whether a high resolution image captured by the corresponding camera 12 includes a human face.

Each of the image resolution modules 42 is also configured to define a location of the object of interest within the high resolution image captured by the corresponding camera 12 when the image resolution module 42 determines that the high resolution image includes an object of interest. The location of the object of interest relative to the entire high resolution image captured by the corresponding camera 12 may be defined in any suitable manner. For example, according to various embodiments, the relative location of the object of interest is defined by coordinates (e.g., the four corners of the object of interest, the center point and radius of the object of interest, etc.) associated with the object of interest.

Each of the image resolution modules 42 is further configured to generate two images associated with the high resolution image captured by the corresponding camera 12 when the image resolution module 42 determines that the high resolution image includes an object of interest. The first associated image is a high resolution image of the object of interest portion (e.g., the portion defined by the coordinates) of the high resolution image captured by the camera 12. The second associated image is a low resolution image of the high resolution image captured by the camera 12. According to various embodiments, the location of the object of interest relative to the entire high resolution image captured by the corresponding camera 12, and the two associated images generated by a given image resolution module 42, are sent to the control system 14 in lieu of the high resolution image captured by the corresponding camera 12. Collectively, the two associated images and the relative location of the object of interest may be considered to be composite information.

The system 40 of FIG. 4 is also different from the system 10 of FIG. 1 in that the computing device 24 of the control system 14 of system 40 further includes a composite image module 44. According to various embodiments, the composite image module 44 is configured to generate a composite image based on the composite information sent from a given camera 12. The composite image module 44 is in communication with the display module 26, and is configured to send generated composite images to the display module 26. The system 40 of FIG. 4 is also different from the system 10 of FIG. 1 in that the display module 26 is further configured to send a composite image generated by the composite image module 44 to the display device 16.

The composite image module 44 may generate a composite image in any suitable manner. For example, according to various embodiments, the composite image module 44 generates the composite image by superimposing the first associated image (i.e., the high resolution image of the object of interest portion of the high resolution image captured by the camera 12) on the second associated image (i.e., the low resolution image of the high resolution image captured by the camera 12) at the location determined by the image resolution module 42.

According to other embodiments, the composite image module 44 generates the composite image by deleting a portion of the second associated image corresponding to the location of the object of interest as determined by the image resolution module 42. The composite image module 44 then inserts the first associated image onto the remaining portion of the second associated image at the location previously occupied by the deleted portion of the second associated image.

According to yet other embodiments, the composite image module 44 generates the composite image by deleting a portion of the second associated image corresponding to the location of the object of interest as determined by the image resolution module 42. The composite image module 44 then positions the remaining portion of the second associated image over the first associated image such that the location previously occupied by the deleted portion of the second associated image is aligned with the first associated image.

The modules 42, 44 may be implemented in either hardware, firmware, software or combinations thereof. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The respective modules 42 (e.g., software application, computer program) may be stored on computer-readable mediums of the corresponding cameras 12 such that when the mediums are read, the functions described herein are performed. Similarly, the module 44 (e.g., software application, computer program) may be stored on another computer-readable medium (e.g., disk, device, and/or propagated signal) such that when a computer reads the medium, the functions described herein are performed.

According to various embodiments, the respective modules 42 may reside at the corresponding cameras 12, and may be in communication with the corresponding resolution selection modules 18. The module 44 may be in communication with the modules 26, 28 and 30, and may reside at the computing device 24, at other devices within the system 40, or combinations thereof. For embodiments where the system 40 includes more than one computing device 24, the module 40 may be distributed across a plurality of computing devices 24.

Figure 5:
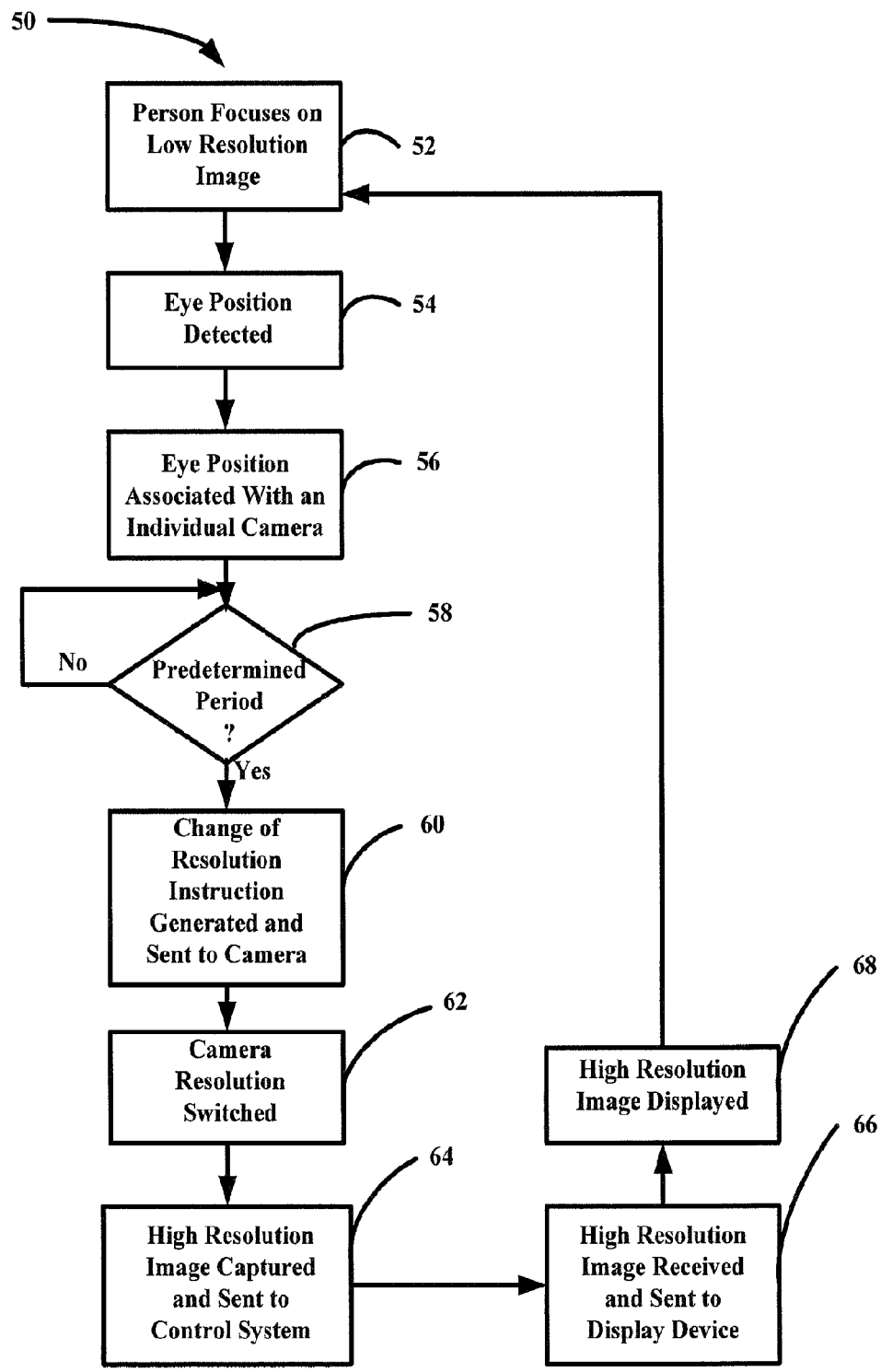
FIG. 5 illustrates various embodiments of a method for controlling the data flow rate of a video network.

FIG. 5 illustrates various embodiments of a method 50 for controlling the data flow rate of a video network. The method 50 may be implemented by various components of the system 10 of FIG. 1. For purposes of simplicity, the method 50 will be described in the context of the system 10 of FIG. 1.

Prior to the start of the process 50, each of the cameras 12 may be operating at a low resolution, and sending low resolution images to the control system 14 via the network 20. The control system 14 may be receiving the low resolution images, and sending the low resolution images to the display device 16 via the display module 26. The display device 16 may be receiving the low resolution images, and displaying the low resolution images for viewing by a person or other user.

The process 50 starts at block 52, where the person focuses on a particular low resolution image which is displayed on the display device 16. From block 52, the process advances to block 54, where the eye tracking device 22 detects the position of a person's eyes who is viewing the display device 16, and sends an indication of the detected eye position to the eye tracking module 28.

From block 54, the process advances to block 56, where the eye tracking module 28 associates the indication of the detected eye position with a position on the display device 16, associates the position on the display device 16 with an image on the display device 16, and associates the image on the display device 16 with an individual camera 12.

From block 56, the process advances to block 58, where the computing device 24 determines if the person has been focusing on the same image for a predetermined period of time. The computing device 24 may determine if the person has been focusing on the same image for a predetermined period of time in any suitable manner. For example, according to various embodiments, the computing device 24 may maintain a timer which resets every time the eye tracking module 28 associates the indication of the detected eye position with a particular image on the display screen 16. According to various embodiments, the predetermined period of time may be in the range of approximately 1.5 to 2 seconds. According to other embodiments, the predetermined period of time may be more than 2 seconds or less than 1.5 seconds.

At block 58, if the computing device 24 determines that the person has been focusing on the same image for at least the predetermined period of time, the process advances to block 60, where the camera resolution module 30 generates a change of resolution instruction and sends the change of resolution instruction to the associated camera 12 (i.e., the camera 12 associated with the viewed image). The change of resolution instruction is an instruction to change the resolution of the associated camera 12 from the low resolution to a high resolution.

From block 60, the process advances to block 62, where the associated camera 12 receives the change of resolution instruction, and the resolution selection module 18 causes the associated camera 12 to switch from the low resolution to the high resolution. From block 62, the process advances to block 64, where the associated camera 12 now captures a high resolution image and sends the high resolution image to the control system 14 via the network 20.

From block 64, the process advances to block 66, where the control system 14 receives the high resolution image from the associated camera 12, and sends the high resolution image to the display device 16 via the display module 26. From block 66, the process advances to block 68, where the display device 16 receives the high resolution image, and displays the high resolution image for viewing by the person or other user. As described hereinabove, the high resolution image may occupy a larger area of the display device than any of the individual low resolution images.

From block 68, the process returns to block 52 when the person changes his or her focus from the high resolution image to a different image (e.g., a low resolution image) which is displayed on the display device 16. The process described at blocks 52-68 may be repeated any number of times.

The execution of the process described in blocks 52-68 results a low resolution image on the display device 16 being replaced with a high resolution image after the person is focused on the low resolution image for a predetermined period of time. Thus, only one camera 12 at a time is sending high resolution images, thereby minimizing the bandwidth needed to effectively operate the system 10. For the four camera 12 example of the system 10 of FIG. 1, the utilization of the above-described method 50 lowers the needed bandwidth on the order of approximately 75% (from 38 Mbt/s to approximately 9.5 Mbt/s).

Figure 6:
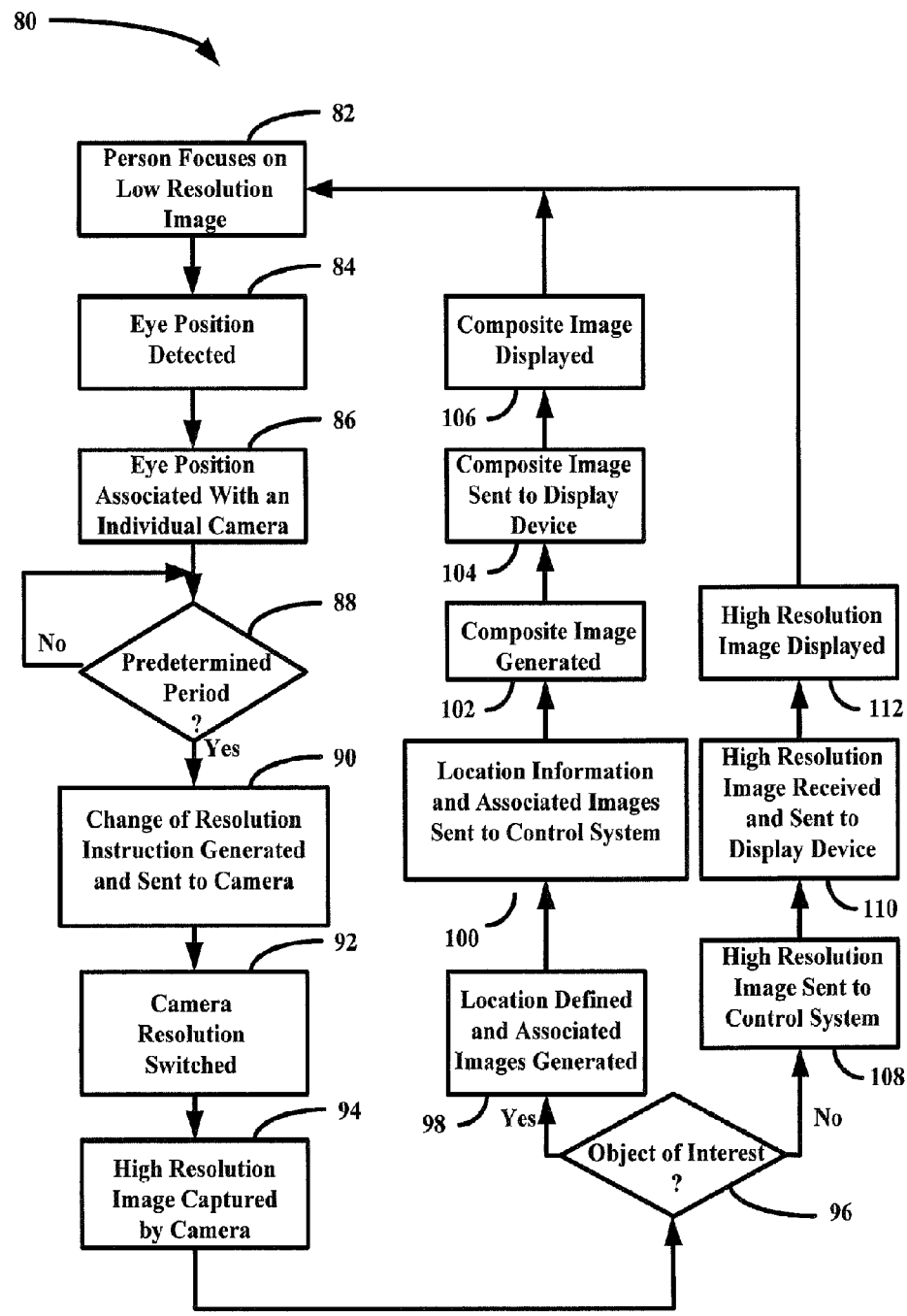
FIG. 6 illustrates various embodiments of another method for controlling the data flow rate of a video network.

FIG. 6 illustrates various embodiments of another method 80 for controlling the data flow rate of a video network. The method 80 may be implemented by various components of the system 40 of FIG. 4. For purposes of simplicity, the method will be described in the context of the system 40 of FIG. 4.

Prior to the start of the process 80, each of the cameras 12 may be operating at a low resolution, and sending low resolution images to the control system 14 via the network 20. The control system 14 may be receiving the low resolution images, and sending the low resolution images to the display device 16 via the display module 26. The display device 16 may be receiving the low resolution images, and displaying the low resolution images for viewing by a person or other user.

The process 80 starts at block 82, where the person focuses on a particular low resolution image which is displayed on the display device 16. From block 82, the process advances to block 84, where the eye tracking device 22 detects the position of a person's eyes who is viewing the display device 16, and sends an indication of the detected eye position to the eye tracking module 28.

From block 84, the process advances to block 86, where the eye tracking module 28 associates the indication of the detected eye position with a position on the display device 16, associates the position on the display device 16 with an image on the display device 16, and associates the image on the display device 16 with an individual camera 12.

From block 86, the process advances to block 88, where the computing device 24 determines if the person has been focusing on the same image for a predetermined period of time. The computing device 24 may determine if the person has been focusing on the same image for a predetermined period of time in any suitable manner. For example, according to various embodiments, the computing device 24 may maintain a timer which resets every time the eye tracking module 28 associates the indication of the detected eye position with a particular image on the display screen 16. According to various embodiments, the predetermined period of time may be in the range of approximately 1.5 to 2 seconds. According to other embodiments, the predetermined period of time may be more than 2 seconds or less than 1.5 seconds.

At block 88, if the computing device 24 determines that the person has been focusing on the same image for at least the predetermined period of time, the process advances to block 90, where the camera resolution module 30 generates a change of resolution instruction and sends the change of resolution instruction to the associated camera 12 (i.e., the camera 12 associated with the viewed image). The change of resolution instruction is an instruction to change the resolution of the associated camera 12 from the low resolution to a high resolution.

From block 90, the process advances to block 92, where the associated camera 12 receives the change of resolution instruction, and the resolution selection module 18 causes the associated camera 12 to switch from the low resolution to the high resolution. From block 92, the process advances to block 94, where the associated camera 12 now captures a high resolution image.

From block 94, the process advances to block 96, where the image resolution module 42 of the associated camera 12 determines if the high resolution image captured by the associated camera 12 includes a particular object of interest (e.g., a human face). From block 96, the process advances to either block 98 or to block 108.

At block 96, if the image resolution module 42 determines that the high resolution image includes the particular object of interest, the process advances from block 96 to block 98, where the image resolution module 42 defines a location of the object of interest within the high resolution image (i.e., location information), and generates two images associated with the high resolution image. The first associated image is a high resolution image of the object of interest portion of the high resolution image captured by the associated camera 12. The second associated image is a low resolution image of the high resolution image captured by the associated camera 12. From block 98, the process advances to block 100, where the associated camera 12 sends the location information and the two associated images to the control system 14 via the network 20 (collectively the composite information).

From block 100, the process advances to block 102, where the composite image module 44 receives the composite information and generates a composite image based on the received composite information. The composite image module 44 may generate a composite image in any suitable manner. For example, according to various embodiments, the composite image module 44 generates the composite image by superimposing the first associated image on the second associated image at the location defined by the image resolution module 42.

According to other embodiments, the composite image module 44 generates the composite image by deleting a portion of the second associated image corresponding to the location of the object of interest as determined by the image resolution module 42. The composite image module 44 then inserts the first associated image onto the remaining portion of the second associated image at the location previously occupied by the deleted portion of the second associated image.

According to yet other embodiments, the composite image module 44 generates the composite image by deleting a portion of the second associated image corresponding to the location of the object of interest as determined by the image resolution module 42. The composite image module 44 then positions the remaining portion of the second associated image over the first associated image such that the location previously occupied by the deleted portion of the second associated image is aligned with the first associated image.

From block 102, the process advances to block 104, where the control system 14 sends the composite image to the display device 16 via the display module 26. From block 104, the process advances to block 106, where the display device 16 receives the composite image, and displays the composite image for viewing by the person or other user. The composite image may occupy a larger area of the display device 16 than any of the individual low resolution images.

From 106, the process returns to block 82 when the person changes his or her focus from the composite image to a different image (e.g., a low resolution image) which is displayed on the display device 16. The process described at blocks 82-106 may be repeated any number of times.

The execution of the process described in blocks 82-106 results in a low resolution image on the display device 16 being replaced with a composite image after the person is focused on the low resolution image for a predetermined period of time. Thus, only one camera 12 at a time is sending high resolution images (e.g., the object of interest portion of the high resolution image captured by the associated camera 12), thereby minimizing the bandwidth needed to effectively operate the system 40. For the four camera 12 example of the system 40 of FIG. 4, the utilization of the above-described method 80 lowers the needed bandwidth on the order of approximately 88% (from 38 Mbt/s to approximately 4.5 Mbt/s) when the high resolution image captured by the associated camera 12 includes the object of interest.

At block 96, if the image resolution module 42 determines that the high resolution image does not include the particular object of interest, the process advances from block 96 to block 108, where the associated camera 12 sends the high resolution image to the control system 14. From block 108, the process advances to block 110, where the control system 14 sends the high resolution image to the display device 16 via the display module 26. From block 110, the process advances to block 112, where the display device 16 receives the high resolution image, and displays the high resolution image for viewing by the person or other user. As described hereinabove, the high resolution image may occupy a larger area of the display device 16 than any of the individual low resolution image.

From block 112, the process returns to block 82 when the person changes his or her focus from the high resolution image to a different image (e.g., a low resolution image) which is displayed on the display device 16. The process described at blocks 82-96 and 108-112 may be repeated any number of times.

The execution of the process described in blocks 82-96 and 108-112 results a low resolution image on the display device 16 being replaced with a high resolution image after the person is focused on the low resolution image for a predetermined period of time. Thus, only one camera 12 at a time is sending high resolution images, thereby minimizing the bandwidth needed to effectively operate the system 40. For the four camera 12 example of the system 40 of FIG. 4, the utilization of the above-described method 80 lowers the needed bandwidth on the order of approximately 75% (from 38 Mbt/s to approximately 9.5 Mbt/s) when the high resolution image captured by the associated camera 12 does not include the object of interest.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A system, comprising:
a plurality of multiple resolution cameras, wherein each of the plurality of multiple resolution cameras has a single type of image sensor and is configured for:
communicably receiving resolution selection instructions;
detecting a presence of a predefined object of interest within a single frame of a captured image;
generating location information describing a location of the predefined object of interest within the captured image;
generating a first image at a first resolution comprising at least a first portion of the captured image;
generating a second image at a second resolution comprising at least a second portion of the captured image, the second portion including the detected predefined object of interest, wherein the first resolution is lower than the second resolution;
communicably sending composite information, wherein the composite information comprises the first image, the second image and the location information; and
a computing device communicably connected to the plurality of multiple resolution cameras, wherein the computing device is configured for:
receiving a first composite information comprising the composite information from one of the plurality of multiple resolution cameras;
generating user focus information;
generating a display image including a multiple resolution composite image based on the first composite information, wherein each portion of the multiple resolution composite image is generated at the same frame rate; and
generating the resolution selection instructions in response to the user focus information; and
communicably sending the resolution selection instructions to one or more of the plurality of multiple resolution cameras; and
a display device communicably connected to the computing device, the display device being configured to display at least the display image.

2. The system of claim 1, further comprising an eye tracking device communicably connected to the computing device, wherein the eye tracking device communicates eye tracking information to the computing device, the computing device being further configured to generate the user focus information by associating the eye tracking information with a first location on the display device.

3. The system of claim 1, further comprising an eye tracking device communicably connected to the computing device, wherein the eye tracking device communicates eye tracking information to the computing device, the computing device being further configured to generate the user focus information by associating the eye tracking information with a first image on the display device.

4. The system of claim 1, further comprising an eye tracking device communicably connected to the computing device, wherein the eye tracking device communicates eye tracking information to the computing device, the computing device being further configured to generate the user focus information by associating the eye tracking information with a first one of the plurality of multiple resolution cameras.

5. The system of claim 1, wherein the display image further comprises additional low resolution images generated by one or more of the plurality of multiple resolution cameras.

6. A method, implemented at least in part by a computing device, the method comprising:
  utilizing a plurality of multiple resolution cameras having a single type of image sensor to capture, at an instance in time:
    an image with a first one of the plurality of multiple resolution cameras at a first resolution; and
    a plurality of other images with the other of the plurality of multiple resolution cameras at a second resolution, wherein the first resolution is different from the second resolution;
  generating, at the first one of the plurality of multiple resolution cameras, composite information by:
    creating a first image based on the captured image at a resolution that is lower than the first resolution;
    detecting a presence of a predefined object of interest within a single frame of the captured image;
    creating object of interest information that identifies a location of the predefined object of interest relative to the first image; and
    creating a second image at the first resolution, wherein the second image comprises a portion of the captured image that is associated with the predefined object of interest; and
  generating, at the computing device, user focus information;
  receiving, at the computing device, the composite information sent from the first one of the plurality of multiple resolution cameras; and
  generating, at the computing device, resolution selection instructions based on the user focus information;
  sending the resolution selection instructions to the plurality of multiple resolution cameras; and
  generating, at the computing device, a display image which includes a multiple resolution composite image based on the received composite information, wherein each portion of the composite image is generated at the same frame rate; and
  sending the display image to a display device.

7. The method of claim 6, wherein generating the composite image comprises superimposing a portion of the second image on the first image based on the defined location information.

8. The method of claim 6, wherein generating the composite image comprises:
  deleting a portion of the first image; and
  filling the deleted portion with a portion of the second image.

9. The method of claim 6, further comprising receiving, at the computing device, eye tracking information from an eye tracking device; wherein generating user focus information further comprises associating the eye tracking information with a location on the display device.

10. The system of claim 1, wherein the display image further comprises additional low resolution images generated by one or more of the plurality of multiple resolution cameras.

* * * * *